(12) United States Patent
Kulik et al.

(10) Patent No.: US 9,114,600 B2
(45) Date of Patent: Aug. 25, 2015

(54) METHOD FOR CREATING A VACUUM SETUP FOR PRODUCING A FIBER COMPOSITE PART, AND PLUNGER USED IN THE METHOD

(75) Inventors: Christian Kulik, Osterholz-Scharmbeck (DE); Christian Tuemena, Stuhr (DE)

(73) Assignee: Premium AEROTEC GmbH, Augsburg (DE)

( * ) Notice: Subject to any disclaimer, the term of this patent is extended or adjusted under 35 U.S.C. 154(b) by 857 days.

(21) Appl. No.: 13/249,961

(22) Filed: Sep. 30, 2011

(65) Prior Publication Data

US 2012/0080142 A1    Apr. 5, 2012

(30) Foreign Application Priority Data

Oct. 2, 2010  (DE) .......................... 10 2010 047 346

(51) Int. Cl.
- *B32B 37/10* (2006.01)
- *B29C 70/44* (2006.01)
- *B29C 33/40* (2006.01)
- *B29C 70/34* (2006.01)

(52) U.S. Cl.
CPC .............. *B32B 37/10* (2013.01); *B29C 33/405* (2013.01); *B29C 70/342* (2013.01); *B29C 70/44* (2013.01); *B32B 37/1018* (2013.01); *Y10T 156/103* (2015.01)

(58) Field of Classification Search
CPC .... B32B 37/10; B32B 37/1018; B29C 70/44; B29C 70/342; B29C 70/443

USPC .......................................... 156/285, 286, 381
See application file for complete search history.

(56) References Cited

U.S. PATENT DOCUMENTS

| | | | |
|---|---|---|---|
| 3,614,811 A * | 10/1971 | Johnson ........................ | 425/389 |
| 4,770,838 A * | 9/1988 | Cattanach et al. ............ | 264/510 |
| 2004/0265406 A1 | 12/2004 | Lorenz et al. | |
| 2008/0023867 A1 * | 1/2008 | Kieffer ........................ | 264/102 |

FOREIGN PATENT DOCUMENTS

| | | |
|---|---|---|
| DE | 198 59 798 C1 | 12/1999 |
| DE | 101 56 123 A1 | 5/2003 |
| DE | 103 31 358 A1 | 2/2004 |
| DE | 10 2007 023 229 A1 | 11/2008 |
| DE | 10 2008 017 381 A1 | 10/2009 |

\* cited by examiner

*Primary Examiner* — Christopher Schatz
(74) *Attorney, Agent, or Firm* — Crowell & Moring LLP

(57) ABSTRACT

A method for creating a vacuum setup for processing a semi-finished fiber composite into a cured fiber composite component is provided. The semi-finished fiber composite is positioned on a molding surface of a tool so that a non-planar surface of the semi-finished fiber composite faces away from the molding surface, covering the non-planar surface of the semi-finished fiber composite by applying an air-tight film and sealing the film with respect to the molding surface of the tool. Application of the film is performed using a plunger formed from a flexible material and having a plunger surface on which the film is retained.

13 Claims, 3 Drawing Sheets

METHOD FOR CREATING A VACUUM SETUP FOR PRODUCING A FIBER COMPOSITE PART, AND PLUNGER USED IN THE METHOD

BACKGROUND AND SUMMARY OF THE INVENTION

The present invention relates to the field of fiber composite technology and in particular to a method for creating a vacuum setup for processing a semi-finished fiber composite into a cured fiber composite component having a non-planar surface.

German patent document DE 101 56 123 B4 discloses conventional vacuum setup. The known vacuum setup is for processing a semi-finished fiber composite composed of a plurality of components into a cured fiber composite part. After the semi-finished fiber composite has been positioned on a molding surface of a tool, the semi-finished fiber composite's surface facing away from the molding surface of the tool is covered by an arrangement of a plurality of membranes and an air-tight film. After sealing the film with respect to the molding surface of the tool, a space covered by the film and containing the semi-finished fiber composite can be de-aerated (i.e., evacuated) in order to perform an enclosed curing of the semi-finished fiber composite, during which the individual components of the semi-finished fiber composite are cured and at the same time firmly bonded to each other (so-called "co-curing").

Such vacuum setups are known from the field of fiber composite technology in various further embodiments.

In general, it is possible in this manner to, for example, implement or simplify an infiltration of the semi-finished fiber composite or individual components thereof with a liquid or viscous matrix material (e.g. epoxy resin system) if the semi-finished fiber composite or individual components of a fiber composite composition are employed "dry" (i.e., not yet infiltrated with matrix material).

Independent of this, the vacuum setup represents a simple mechanism for pressurizing the semi-finished fiber composite prior to and/or during (mostly thermally-induced) curing so as to "compact" the semi-finished fiber composite, or, in case of a multi-part semi-finished composite, to firmly press the individual components of the latter against each other (and to implement a so-called "co-bonding"). In order to increase the effect of the vacuum (low-pressure) for generating pressure, the outside of the air-tight film or the entire vacuum setup is often also pressurized by an external over-pressure. For example, the vacuum setup (e.g., prior to begin of curing) is placed into a pressure chamber (autoclave). The internal pressure of such a pressure chamber during curing can be set, for example, to values in the range of approximately 5 to 10 bar.

In case of the known methods for creating a vacuum setup, the film is applied manually which involves certain efforts, in particular if the vacuum setup serves for producing a particularly large fiber composite part.

Because the film has to be applied directly or indirectly (e.g., through an arrangement of membranes etc.) on a non-planar surface of the semi-finished fiber composite, there is a disadvantageously low reproducibility of this method step, which can represent a problem in particular in a series production of fiber composite parts.

In many cases, the film is not applied in a wrinkle-free manner, which results in a non-uniform pressurization in the subsequent curing process. This particularly significant if the non-planar surface of the semi-finished composite has a non-unwindable shape. In this case, wrinkles in the film applied according to the known methods are unavoidable.

Exemplary embodiments of the present invention improve the creation of a vacuum setup of the aforementioned type with respect to reproducibility of the application of the film and allow an application as wrinkle-free as possible, in particular also in case of a non-unwindable configuration of the shape of the surface of the semi-finished fiber composite.

In accordance with exemplary embodiments of the present invention, the application of the film is performed using a plunger formed from a flexible material and having a plunger surface on which the film is retained.

The term "plunger" is meant to designate an auxiliary mechanism that retains the film (on a "plunger surface") and which, for applying the film, is moved toward the surface of the semi-finished fiber composite and is subsequently moved away again (without the film) from said surface.

The transfer of the film from the plunger to the vacuum setup can be carried out automatically in that the plunger is held and moved by a robot or the like.

The plunger is formed from a flexible material such as, for example, a plastic material, in particular foamed plastic, e.g., PU foam or a flexible fiber composite material (e.g., relatively thin fiber mat inside a layer of a permanently elastic matrix material that is considerably thicker than the fiber mat). The plunger, or alternatively at least a section representing the plunger surface, can include such a mechanically flexible material. Apart from the resulting gentle treatment of the film and the semi-finished fiber composite (and/or a membrane arrangement potentially placed thereabove), the flexibility of the plunger has a further significant advantage in the case of a generally concave or convex, uniaxially or biaxially curved non-planar surface of the semi-finished fiber composite. In this case, the flexibility of the plunger permits that at each position of the concave or convex surface of the semi-finished composite, the plunger surface can be locally moved substantially orthogonal toward this surface and can be moved away again from this surface. Depending on the geometry of the surface, a non-simultaneous advancing (and, correspondingly, backward) movement of the individual regions of the plunger surface toward the semi-finished fiber composite (or away from the semi-finished fiber composite) can be required. To put it simply, the flexibility of the plunger material advantageously allows the plunger or at least portions thereof to "roll" over the respective surface.

A correspondingly interesting form of use of the invention involves processing a semi-finished fiber composite, the non-planar surface of which is generally curved but has local indentations and/or embossments. In this case the flexibility of the plunger is of great advantage.

In a preferred configuration, due to the use of the flexible material, the plunger can be subjected to, for example, a significant diameter change without getting irreversibly damaged. For example, in the relaxed state of the plunger, a "rough shape" of the plunger surface can have a uniaxial "cylindrical" curvature, wherein the curvature (during the inventive use of the plunger) can be significantly changed without the plunger getting irreversibly damaged because of this. A significant curvature change is achieved if, for example, a certain diameter (in the relaxed state of the plunger) can be changed by a factor of at least 1.1 or even by a factor of 2 (thus, can be at least doubled and/or at least halved during the use).

In particular, the non-planar surface of the semi-finished fiber composite can have a non-unwindable shape. In this case, the plunger can be configured in such a manner that, due to the use of the flexible plunger material, the plunger can also be biaxially curved to an extent that the "rough shape" of the plunger surface can be deformed during the use of the plunger in such a manner that the plunger can be applied onto and demolded from the non-unwindable shape of the semi-finished fiber composite without any problem. The invention is therefore suitable also in case of complicated three-dimensionally shaped surfaces of the semi-finished fiber composite. This surface, for example, can be substantially spherically curved, in which case a correspondingly spherically curved "rough shape" of the plunger surface is useful.

The semi-finished fiber composite can consist of one part or multiple parts, i.e., can be composed of a plurality of components. The invention is particularly useful for multi-part semi-finished fiber composites because this multi-part configuration often results in a complicated shape of the surface being covered by the film, which makes the mentioned known manual application of the film extremely problematic.

In the case of a multi-part semi-finished fiber composite, the vacuum setup created according to the invention is preferably used for providing an intimate and firm bonding of the individual components during a subsequent curing (e.g., thermal curing). Principally, each component of the semi-finished fiber composite can be employed dry or already penetrated with matrix material (as so-called "prepreg") for the creation of the vacuum setup. If one or a plurality of dry components are present, first, an infiltration with matrix material according to methods known can be performed at the begin of the curing process. Such methods are well known from the prior art and therefore do not require a detailed explanation here. Merely as an example, reference is made to the above-mentioned German patent document DE 101 56 123 B4, in which such an infiltration of a component of the semi-finished fiber composite enclosed in the vacuum setup is described.

According to one embodiment of the invention, a semi-finished fiber composite is processed, the composite being composed of at least one shell-shaped component and at least one reinforcement profile component.

The shell-shaped component can, in particular, be provided for forming a fuselage shell of a vehicle, in particular aircraft, and can have, for example, an uniaxial or biaxial curvature. For this use, the reinforcement profile components can be provided for forming longitudinally extending reinforcement profiles ("stringers") or transversely extending reinforcement profiles (formers). The invention is in particular suitable for producing CFRP structural elements in aircraft construction.

In a particularly preferred embodiment of the invention, the plunger surface of the plunger used for transferring the film is shaped in adaptation to the non-planar surface of the semi-finished fiber composite.

The term "in adaptation to the surface of the semi-finished fiber composite" is, of course, meant to comprise, in particular, the case that the plunger surface represents a more or less exact "negative" of the surface of the semi-finished fiber composite. However, generally, the adaptation is already to be provided if the plunger surface deviates from a completely planar shape and has a shape which is significantly similar to the non-planar surface of the semi-finished fiber composite. Moreover, such an adaptation is also to be provided if the plunger surface is generally (thus with respect to its "rough shape") concave or convex and therefore follows a generally convex or concave "rough shape" of the surface of the semi-finished fiber composite (independent of whether the plunger surface follows, at a local level, potentially present local indentations and/or embossments of the semi-finished fiber composite surface or not).

Furthermore, the term "surface of the semi-finished fiber composite" designates the surface onto which the film comes to rest during the creation of the vacuum setup. Accordingly, depending on the specific setup, the film is applied directly or indirectly (e.g., through the already mentioned arrangement of membranes, nonwoven layers for infiltration etc.) onto the semi-finished fiber composite.

In a particularly preferred embodiment of the adaptation of the plunger surface to the non-planar surface of the semi-finished fiber composite, the plunger surface follows substantially the "rough shape" (e.g. concavity or convexity) of the respective surface as well as substantially the local indentations and embossments of this surface which are potentially present as deviations from the "ideal" concavity or convexity.

It is to be understood that with a plunger surface adapted in such a manner, the quality and reproducibility of the film application can be further improved. For achieving this advantage, first of all, the adaptation of the plunger surface "on a local level" is of significant importance. In this manner, the local indentations and/or embossments (in general: a corrugation) of the surface of the semi-finished fiber composite can be handled very well during the application of the film by the advancing movement of the plunger surface toward this surface, which can, for example reduce wrinkling of the film. In contrast, the adaptation of the plunger surface with respect to the rough shape of this surface, thus, a generally curved shape, is in most cases less important because due to the flexibility of the plunger material, this plunger can be brought into this rough shape during the advancing movement toward the semi-finished fiber composite, for example in that the plunger is not moved simultaneously to all areas, but the different regions of the plunger surface are moved successively to the semi-finished fiber composite. Very advantageous for this is, for example, the plunger's configuration already mentioned above, in which the plunger surface has a particular curvature in the relaxed state which, however, can be significantly changed due to the flexibility of the plunger. When using such a plunger it can in particular be provided that prior to and after the film transfer, the plunger's diameter can be decreased (in case of a concave surface of the respective semi-finished fiber composite) or increased (in case of a convex surface of the semi-finished fiber composite) in order to simplify or to actually allow the advancing movement and also the subsequent demolding of the plunger by means of this curvature change (prevention of collisions between plunger and semi-finished fiber composites that could result in damage to the plunger and/or the semi-finished fiber composite), in particular also in case of a corrugated surface of the semi-finished fiber composite.

In one embodiment, for example, that for applying the film by means of the plunger, the latter is first advancingly moved with a middle region of the plunger surface, and outer plunger surface regions are then successively moved by "rolling" these regions over the surface of the semi-finished fiber composite. Once film deposition is completed, the plunger can be retracted by a kinematically reversed movement in such a manner that first one or a plurality of outer plunger regions are removed from the surface and only then, the plunger regions located further in the middle are successively removed.

In one further embodiment of this "rolling method", in its relaxed state, the plunger used for this has at least one plunger surface section (or, e.g., a plunger surface as such), the curvature of which lies "between the extreme curvatures occurring during the use of the plunger". For example, if the respective semi-finished fiber composite has, e.g., a concave surface with a curvature diameter of 3.0 m, then the curvature diameter of the relaxed plunger could be, for example, 2.9 m, wherein the advancing movement takes place in a "rolled-in state" with a curvature diameter of 2.8 m. The "relaxed diameter" thus lies between the extreme diameters of 2.8 m and 3.0 m occurring during the use.

An adaptation of the plunger surface to the non-planar surface of the semi-finished fiber composite is particularly advantageous if a principally planar film is applied onto the shape-adapted and thus non-planar plunger surface and is fastened or retained thereon. In one very advantageous further embodiment the plunger is equipped with means for deforming the film retained thereon in adaptation of the latter to the configuration of the shape of the plunger surface and that this deformation is carried out prior to or during covering the non-planar surface of the semi-finished fiber composite. The particular advantage of this further embodiment is that the film can be brought from an originally plane shape (or only uniaxially curved shape on the plunger surface) into a complicated shape, in particular into a non-unwindable shape, for example by adapting to the largest possible extent to the configuration of the shape of the plunger surface.

The deformation of the film can be carried out, for example, by elongating the film material, wherein the film material is only stressed up to approximately its elastic limit so that the film material is not significantly irreversibly deformed.

However, in an alternative embodiment, the deformation of the film is performed by elongating the film material in a plastically deforming manner. In doing so, an irreversible elongation of the film, at least in certain regions (e.g., in the region of local indentations and/or embossments of the surface of the semi-finished fiber composite) can be at least 10%, in particular at least 50%. Depending on the specific case of use, the irreversible elongation can also be selected to be considerably greater, for example greater than 100%. It should be recognized that for creating the vacuum setup in question, a plurality of suitable plastic films (e.g., made of nylon or the like) is commercially available that resist an elongation of up to approximately 400% without breaking.

One possibility to perform the mentioned plastically deforming elongation is, for example, that on a "local level", the film initially applied on the plunger surface in the undeformed state (e.g., circumferentially attached to the edge of the plunger surface) is deformed corresponding to a corrugation on the plunger surface in that the plunger together with the film retained thereon is pressed against a suitably shaped counter plunger or "anvil" made of solid material. Pressing the plunger onto the semi-finished fiber composite, which is principally also conceivable, is problematic with respect to a potential deformation of the semi-finished fiber composite caused thereby.

A preferred embodiment variant of the means for deforming the film provides that said means comprise at least one vacuum passage opening out on the plunger surface, and deforming the film is carried out by applying low-pressure to the vacuum passage(s). This method is not only simple and cost-effective but allows a virtually perfect adaptation of the film shape to the shape of the plunger surface. By applying low-pressure (vacuum), the film rests tight against the plunger surface.

Preferably, the deformation of the film on the plunger surface is carried out before the plunger is advancingly moved to the semi-finished fiber composite.

When the deformation means is implemented by means of vacuum passage(s), it is useful to apply the low-pressure to the vacuum passage(s) before putting the plunger onto the semi-finished fiber composite and to maintain said low-pressure when the pressing on the plunger. This prevents the elongation of the film generated during the low-pressure application being reduced again due to elastic (reversible) elongation portions before the film is attached onto the semi-finished fiber composite. Against this background, for example, one or a plurality of flexible vacuum hoses connected to a vacuum pump can be connected to the vacuum passage(s) of the plunger in order to advancingly move the plunger together with the film, which is kept in the deformed state by the applied low-pressure, to the semi-finished fiber composite of the vacuum setup while maintaining the low-pressure application. As already mentioned, this can be carried out manually or at least partially automated, e.g. by means of a robot or the like.

In a further embodiment of the advancing movement of the plunger to the semi-finished fiber composite by applying low-pressure to the plunger, the arrangement of vacuum passage(s) of the plunger is equipped with a lockable valve, which allows for locking the vacuum passage(s) previously placed under a vacuum so that after closing the valve, the respective vacuum hose can be decoupled from the plunger. In this case it is possible that after putting the plunger onto the semi-finished fiber composite positioned on the tool, this valve can be opened again to thereby aerate the vacuum passage(s). Preferably, this takes place only after the low-pressure application of the vacuum setup (which draws the film onto the semi-finished fiber composite) has been activated.

If the plunger surface is corrugated, i.e., has local indentations or embossments, apertures of a vacuum passage arrangement can in particular be provided at the bottoms of the indentations or spaced part from the embossments so as to draw the film into the recessed regions of the plunger surface. The arrangement of vacuum passages can extend, for example, through the interior of the plunger to lateral or rear locations of the plunger at which the mentioned vacuum hoses can be connected.

According to a further aspect, the invention relates to plunger suitably configured for carrying out a method of the aforementioned kind. Such a plunger is formed from a flexible material, and can comprise a non-planar plunger surface for retaining the film as well as means for deforming the film retained thereon in adaptation to the non-planar plunger surface. As already explained, the deforming means can comprise an arrangement of one or a plurality of vacuum passages that open out on the one side at one or more locations of the plunger surface and can be connected on the other side at the lateral edge and/or the rear side of the plunger to one or a plurality of vacuum lines (e.g. flexible, air-tight hoses).

Such a plunger can be manufactured, for example, in that a vacuum passage arrangement formed by a hose arrangement is placed into a molding tool and is overmolded with plastic material (e.g., foamed plastic) or embedded in foam.

With such a plunger, an advantageous device for transferring the air-tight film to the vacuum setup or e.g. a curing device is created. Moving the device forward and backward after transferring the film can be carried out in a particularly advantageous manner by utilizing the elastic bending properties of the device. When made from plastic, the device is light and therefore easy to handle. Despite the simple structure, a high efficiency is obtained.

The method according to the invention for creating a vacuum setup or the plungers according to the invention can be advantageously used for producing fiber composite components of all kinds.

A preferred use is the production of fuselage shells reinforced by reinforcement profiles for vehicles, in particular aircrafts. In a more specific embodiment, this involves fuselage shells for aircrafts, wherein the fuselage shells are substantially uniaxially curved and provided with a plurality of longitudinally extending reinforcement profiles ("stringers").

In particular, in case of such fuselage shells, the reinforcement profiles can be provided so as to extend on the inner side of the fuselage shell. In a special embodiment, the components provided for forming said reinforcement profiles are already fully cured before they are employed during the creation of the vacuum setup, whereas a non-cured prepreg is employed for forming the fuselage shell. In this specific case, only the fuselage shell is cured during the subsequent curing, wherein at the same time, an intimate bonding of the reinforcement profiles to the fuselage shell takes place (so-called "co-bonding").

In general, it should be noted that the specific use of the vacuum setup created according to the invention varies depending on the case of use. Thus, in deviation from the specific example explained above, it is also conceivable, for example, that the vacuum setup is only used within an infiltration process or only within a compacting process or only within a curing process. The present invention relates primarily to the method of creating a vacuum setup suitable for all these cases of use.

Particularly useful are the advantages achievable with the invention for the production of a fiber composite component having a relative large area, e.g., with a maximum extension of more than 5 m, in particular more than 10 m and/or an area (in case of a flat component such as e.g. a fuselage shell on the flat side) of more than 10 m$^2$, in particular more than 20 m$^2$, and/or for the production of a fiber composite component in case of which the non-planar surface of the semi-finished fiber composite employed or the corresponding surface of the finished fiber composite component is generally "strongly curved" or has a clearly pronounced concave or convex shape. The latter means that deviating from a planar shape which has one single normal direction of the surface, the (local) normal directions of the non-planar surface are distributed over a larger angular range (e.g. over at least 30°, in particular at least 60°). Two examples: the angular range is 180° for a uniaxially uniformly curved semi-cylindrical fuselage shell; and the angular range is 90° for a fuselage shell that provides only a quarter of the circumference of a substantially cylindrical fuselage to be formed with said shell.

In case of such large angular ranges of the distribution of the normal, problems in connection with applying (and accordingly, retracting) the plunger surface to the semi-finished fiber composite can be avoided due to the flexibility of the plunger material.

BRIEF DESCRIPTION OF THE DRAWING FIGURES

The invention is further described hereinafter by means of an exemplary embodiment with reference to the attached drawings. In the figures, in each case in a cross-sectional view.

DETAILED DESCRIPTION

Figure 1:
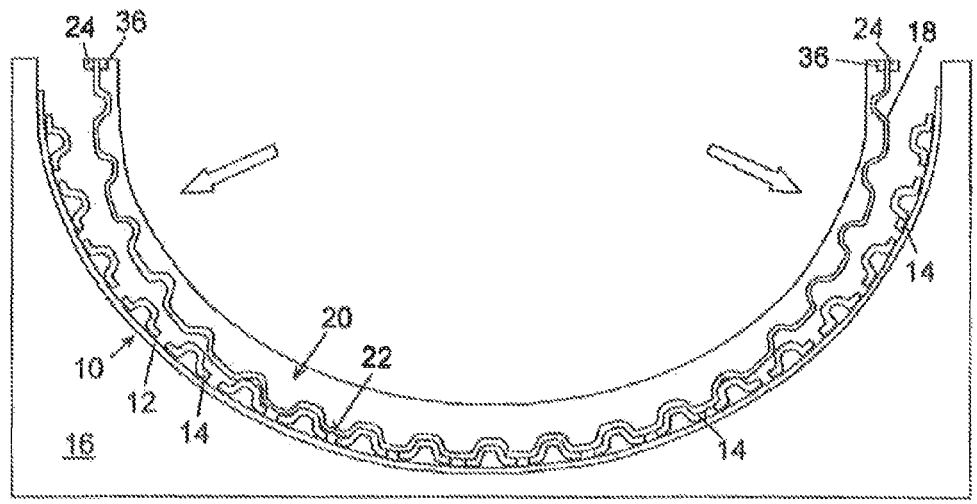
FIG. 1 shows a plunger provided with a deformed film in an advancing movement toward the surface of a semi-finished fiber composite positioned at a tool, in a first stage in which only a middle plunger region rests already against the semi-finished fiber composite.

FIGS. 1 to 4 illustrate a method for creating a vacuum setup for processing a semi-finished fiber composite 10 into a cured fiber composite component.

In the illustrated exemplary embodiment, the semi-finished fiber composite 10 is composed of multiple parts, namely, for example, of a uniaxially curved shell-shaped component 12 and a plurality of longitudinally extending reinforcement profile components 14.

For this, the shell-shaped component 12, which has an approximately semi-cylindrical shape, was first placed onto the molding surface of a tool 16 and subsequently completed with the reinforcement profiles 14.

In the illustrated exemplary embodiment, the shell-shaped component 12 is provided as a so-called prepreg, thus a fiber material pre-impregnated with matrix material, whereas for creating the vacuum setup, the reinforcement profile components 14 are employed as "dry" fiber materials. For improving the adhesion of the components 14 on the inner side of the component 12 and/or for improving the quality of the subsequent bonding of these components 12, 14, a so-called binder layer or a matrix material layer can be introduced quasi as an "adhesive" between in each case one component 14 and the component 12 (not illustrated).

The fiber materials for forming the components 12, 14 can be configured, for example, as single- or multi-layer fabric or web from fibers or fiber bundles ("roving").

In a first method step, after the semi-finished fiber composite 10 has been positioned on the molding surface of the tool 16, a non-planar surface of the semi-finished fiber composite 10 is generated in the illustrated exemplary embodiment, wherein said non-planar surface faces away from the molding surface. This is because the shell-shaped component 12 is not planar and because the otherwise smooth inner side of the shell-shaped component 12 is corrugated by the arrangement of the plurality of the reinforcement profile components 14. The upper side of the semi-finished fiber composite 10 in the figures represents a surface with many local indentations and embossments.

The next method step for creating the vacuum setup includes covering the non-planar surface of the semi-finished fiber composite 10 by an air-tight film 18.

Specifically this second method step is illustrated in the FIGS. 1 to 4, wherein these figures show in each case different stages of the film application.

The film 18 is applied using a plunger 20, which is formed from a flexible material (here: PU foamed plastic) and has a plunger surface 22 to which the film 18 has previously been attached. The film 18 can be retained, for example, by a circumferentially extending fastening, e.g. detachable adhesion, on the plunger surface 22. A particular way of retaining the film 18 on the plunger 20 is provided in the illustrated exemplary embodiment and is explained below.

FIG. 1 shows a first stage in which the plunger's 20 plunger surface 22 provided with the film 18 has been brought to rest in a middle region against the semi-finished fiber composite 10, whereas the two laterally outer plunger surface regions are yet to be brought successively to rest thereon (cf. arrows in FIG. 1). In other words, at the beginning, lateral plunger regions are still slightly "folded-in" or "rolled-in" which is possible without any problems due to the flexibility of the plunger material.

Figure 2:
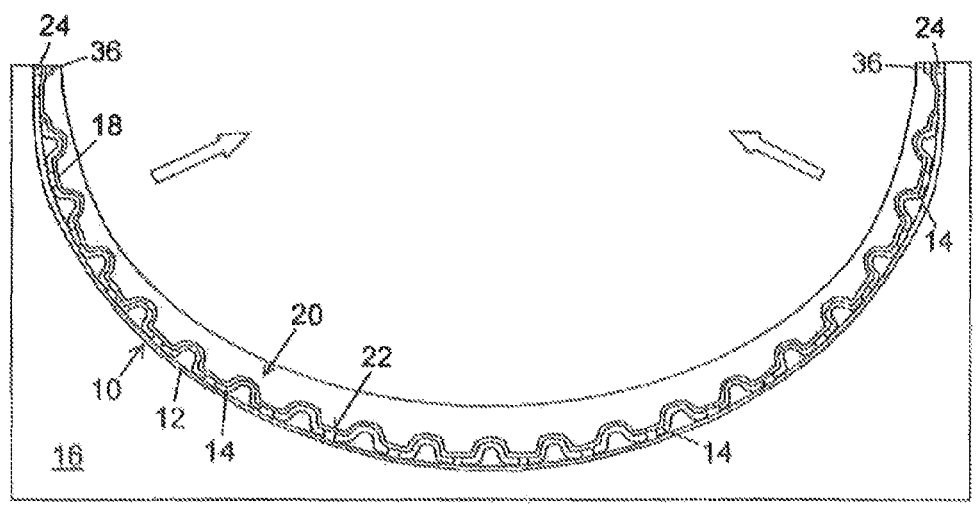
FIG. 2 shows an illustration corresponding to FIG. 1 in a subsequent stage in which the plunger rests over the entire surface against the semi-finished fiber composite and the film is transferred onto the surface of the semi-finished fiber composite.

FIG. 2 shows a second stage in which after "rolling out" the two laterally outer plunger regions, the latter also come to rest against the semi-finished fiber composite 10. In the illustrated example, the configuration of the plunger 20 shown in FIG. 2 corresponds to the plunger's original state (whereas the state illustrated in FIG. 1 corresponds to an elastic deformation of the plunger 20).

According to FIG. 2, the film 18 now rests flatly on the surface of the semi-finished fiber composite 10 and, together with a circumferentially extending seal 24, the semi-finished fiber composite 10 and the tool 16, forms the vacuum setup which is basically already completed.

By applying low-pressure (which is not shown in the figures) to a space enclosed by the film 18 and the molding surface of the tool 16, the semi-finished fiber composite 10 enclosed in said space can be compacted and the individual components 12, 14 can be intimately pressed together. Applying the low-pressure can be performed, for example, via a vacuum hose that runs through an opening of the film 18 and into the space enclosed by the film, wherein the opening is sealed with respect to the hose. Alternatively or additionally it is also possible that corresponding vacuum passages run through the tool 16 and open out into said enclosed space.

However, prior to this, the plunger 20 is retracted in a manner as described below with reference to FIGS. 3 and 4. The fact that the film 18 remains on the vacuum setup or semi-finished fiber composite 10 (and not on the plunger 20) can be ensured in a simple manner because, as illustrated in FIG. 2, the low-pressure application of the vacuum setup is activated so that the film 18 is retained on the semi-finished fiber composite by the low-pressure or is pressed thereon by the higher atmospheric pressure acting on the outer side of the film 18.

Figure 3:
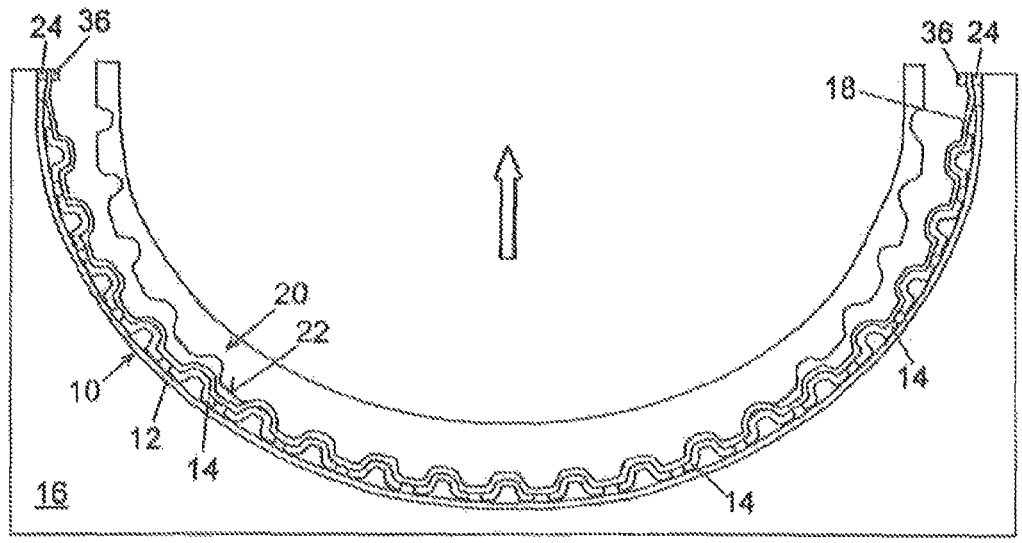
FIG. 3 shows a corresponding illustration in a subsequent stage in which only lateral plunger regions are already removed from the semi-finished fiber composite.

FIG. 3 shows a third stage in which the two laterally outer regions of the plunger 20 were removed by a suitable "rolling-in displacement" (cf. arrows in FIG. 2) from the vacuum setup created at the tool 16 and a subsequent vertical upward displacement of the plunger 20 (cf. arrow in FIG. 3) begins in order to raise also the middle plunger region again from the vacuum setup.

Figure 4:
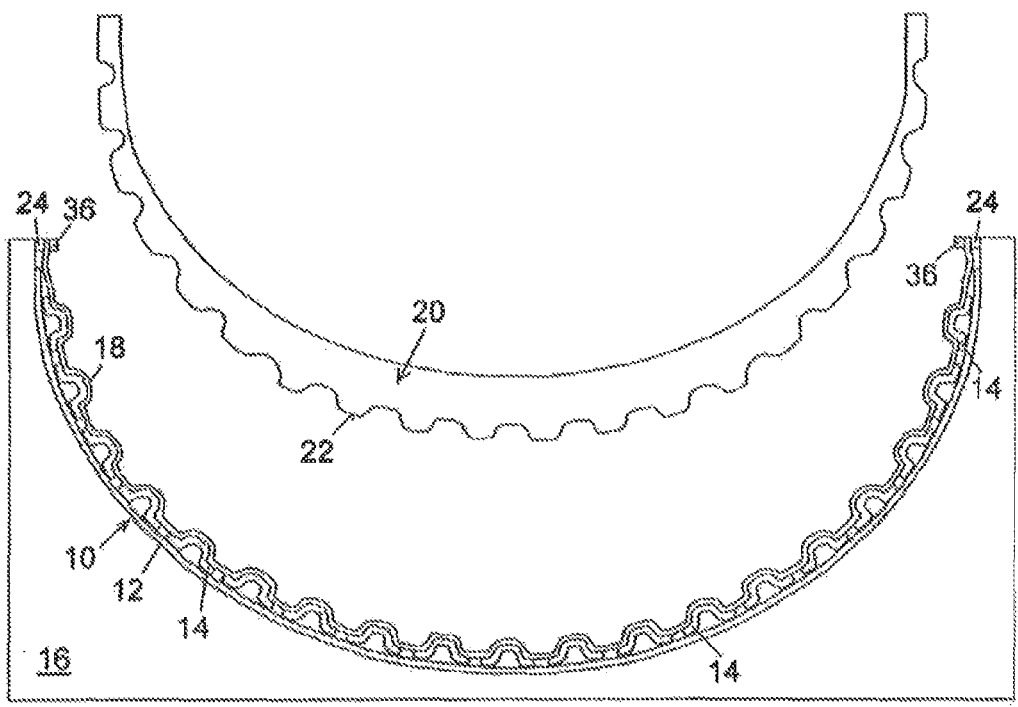
FIG. 4 shows a corresponding illustration after the plunger is completely removed from the semi-finished fiber composite.

FIG. 4 finally shows a fourth stage in which the plunger 20 is completely removed from the tool 16 and the vacuum setup created at the tool.

All displacements of the plunger 20 or bending movement of individual plunger regions described with respect to the FIGS. 1 to 4 can be carried out manually or at least partially automated. For automatically applying the film 18 by means of the plunger 20, the plunger 20 can be connected e.g. with its rear side (in FIGS. 1 to 4) to suitable handling elements of a robot.

The use of the plunger 20 in the described manner allows advantageously a virtually wrinkle-free application of the film 18 and a high degree of reproducibility in case of a series production of fiber composite components.

Another advantage of the invention or the plunger 20 is that the flexible configuration of the plunger usually also means a relatively low weight for the plunger (e.g. in case of a plunger which is at least partially made from a foamed plastic). In a preferred embodiment, the plunger has, e.g., a weight per unit area of less than 100 kg/m², in particular less than 60 kg/m².

In the illustrated exemplary embodiment, sealing the film 18 with respect to the molding surface of the tool 16 is carried out by the seal 24 (e.g. rubber profile or double-sided adhesive tape previously attached to the film 18). Likewise, such a seal could instead already be arranged on the molding surface of the tool 16 at the beginning of the film transfer illustrated by the FIGS. 1 to 4. However, under certain circumstances such a seal can be omitted if, for example, the circumferentially extending edge of the film 18 already provides for a sufficient sealing effect due to the applied low-pressure.

After creating the vacuum setup and removing or "demolding" the plunger 20 (FIG. 4), a thermal curing of the semi-finished fiber composite 10 follows in the described exemplary embodiment, wherein the curing takes place either with the vacuum setup in the ambient atmosphere or by placing the vacuum setup into an autoclave. In the illustrated example, the shell-shaped prepreg 12 thereby cures and forms an intimate bonding with the (already cured) reinforcement profile components 14. The full contact of the film 18 on the semi-finished fiber composite 10 effects a very uniform and reproducible low-pressure application which in turn results in a consistently high quality of the fiber composite component formed therewith.

The process in the illustrated example results in the fabrication of an aircraft fuselage component with integrated stringers.

It is to be understood that the specific structure of the semi-finished fiber composite employed is less important within the context of the invention. The advantages achieved with the invention apply also to differently structured or composed semi-finished fiber composites.

Some advantageous particularities provided in the described exemplary embodiment are discussed below.

One particularity is that the plunger surface 22 is shaped in adaptation to the non-planar surface of the semi-finished fiber composite 10. Thus, when pressing-on the plunger 20, the film 18 is pressed in a particularly uniformly manner against the surface of the semi-finished fiber composite.

Another particularity is that the film 18 retained on the plunger surface 22 is already deformed in adaptation to the configuration of the shape of the plunger surface 22 (and accordingly in adaptation to the shape of the non-planar surface of the semi-finished fiber composite 10) before the plunger 20 comes to rest against the surface of the semi-finished fiber composite 10. In the illustrated exemplary embodiment, said deformation of the film 18 is achieved by an elongation which plastically deforms the film material and in which case an irreversible elongation of the film in the recessed regions of the plunger surface 22 is approximately 100%.

However, deviating from this, the elongation of the film could also be performed only up to an elastic limit at which no or only a minor irreversible elongation remains in the film material.

Even though the deformation of the film 18 can be carried out in different ways prior to applying the film on the semi-finished fiber composite 10, another particularity of the illustrated exemplary embodiment is that the deformation of the film is carried out with the aid of the plunger 20 which is explained in more detail hereinafter by means of the FIGS. 5 and 6.

Figure 5:
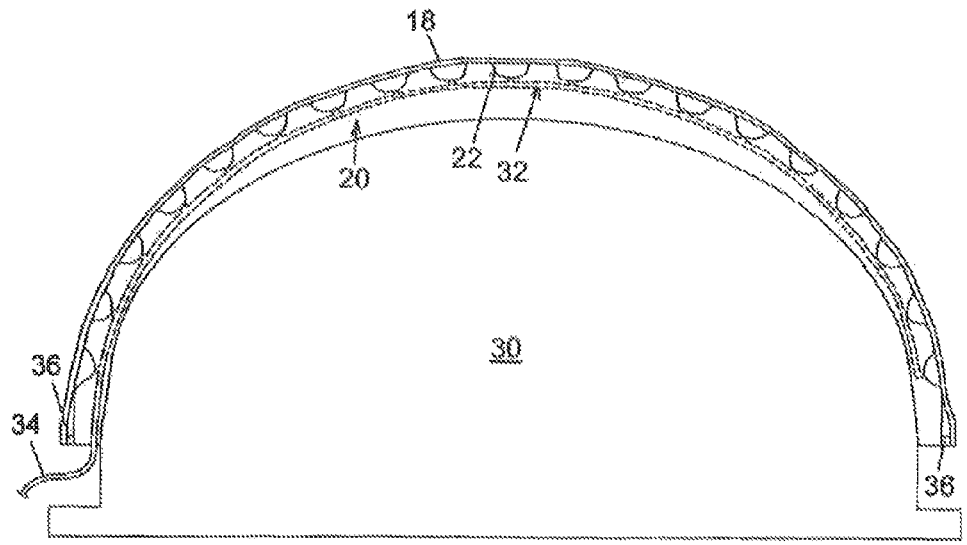
FIG. 5 shows the application of the (still undeformed) film onto the plunger surface of the plunger carried out prior to the method steps according to FIGS. 1 to 4.

FIG. 5 shows a support member 30 onto which the plunger 20 and the film 18 are successively placed as illustrated. Here, the support surface of the support member 30 has a convex shape such that the plunger 20 placed thereon with its rear side adopts approximately the (undeformed) shape in which the plunger 20 subsequently comes to rest against the semi-finished fiber composite 10. (cf. FIG. 4).

Inside the plunger 20 there is an arrangement 32 of vacuum passages to which low-pressure can be applied. As illustrated, this channel arrangement 32 has apertures located in the regions of the indentations of the plunger surface. In order to apply a load to the film 18 on the plunger surface 22 toward the plunger surface 22 and thus to deform the film plastically in adaptation to this plunger surface 22, the vacuum passages are connected via a flexible vacuum hose 34 to a vacuum pump and thus evacuated.

The low-pressure application via the vacuum hose 34 results in the mentioned deformation of the film 18. This state, in which the film 18 rests tight against the plunger surface 22, is illustrated in FIG. 6. For reliably preventing the film 18 and in particular the edge regions thereof from sliding, a fixation of the film 18 is useful, at least at the edge of film. In the illustrated example, this is implemented by a temporary adhesive bonding 36. FIG. 6 further shows the mounting of the seal 24.

Figure 6:
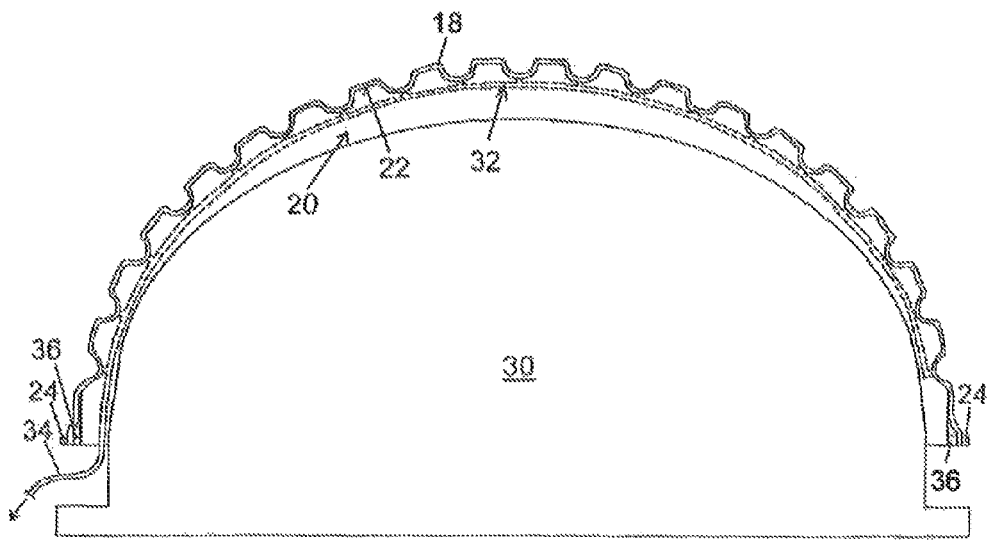
FIG. 6 shows the deformation of the film in adaptation to the plunger surface taking place after application of the film onto the plunger surface according to FIG. 5.

Based on the state according to FIG. 6, the plunger 20 including the (irreversibly or reversibly) deformed film 18 retained thereon is employed for the method steps according to the FIGS. 1 to 4 already explained above. Advantageously, the low-pressure applied to the plunger 20 is maintained here until the plunger 20 rests over the entire surface against the semi-finished fiber composite 10 and the low-pressure application of the vacuum setup is activated so as to retain the film on the semi-finished fiber composite 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for creating a vacuum setup and processing a semi-finished fiber composite into a cured fiber composite component having a non-planar surface, the method comprising the steps:
    positioning the semi-finished fiber composite on a molding surface of a tool so that the non-planar surface of the semi-finished fiber composite faces away from the molding surface;
    releasable applying an air-tight film to a plunger surface; and
    covering the non-planar surface of the semi-finished fiber composite by applying the film via the plunger and sealing the film with respect to the molding surface of the tool; and
    releasing the film from the plunger so that the film is retained on the molding surface and retracting the plunger prior to the processing of the semi-finished fiber composite into the cured fiber composite component.

2. The method according to claim 1, wherein the semi-finished fiber composite is processed, the non-planar surface of which is generally curved and has local indentations or embossments.

3. The method according to claim 1, wherein the semi-finished fiber composite is processed and the semi-finished fiber composite includes at least one shell-shaped component and at least one reinforcement profile component.

4. The method according to claim 1, wherein the plunger surface has a shape adapted to the non-planar surface of the semi-finished fiber composite.

5. The method according to claim 4, wherein the plunger is provided with a mechanism that deforms the film retained thereon in adaptation to the shape of the plunger surface and the deformation is performed prior to or during covering the non-planar surface of the semi-finished fiber composite.

6. The method according to claim 5, wherein the deformation of the film is achieved by an elongation plastically deforming the film material.

7. The method according to claim 6, wherein an irreversible elongation of the film is, in at least in certain regions, at least 10%.

8. The method according to claim 7, wherein the irreversible elongation of the film is, in at least in certain regions, at least 50%.

9. The method according to claim 5, wherein the mechanism for deforming the film comprises at least one vacuum passage opening out on the plunger surface, and deforming the film is achieved by applying low-pressure to the vacuum passage.

10. The method according to claim 1, wherein the plunger surface has a corrugated shape that is a mirror image of a corrugated shape of the non-planar surface of the semi-finished fiber composite and the releasably applying of the film to the plunger surface involves deforming the film into the corrugations of the plunger surface.

11. The method according to claim 10, wherein the deforming of the film into the corrugations of the plunger surface occurs before the plunger is advanced towards the semi-finished fiber composite.

12. The method according to claim 1, wherein the film is deformed into a shape corresponding to the non-planar surface of the semi-finished fiber composite prior to the plunger resting against the non-planar surface of the semi-finished fiber composite.

13. The method according to claim 1, wherein the film is retained on the molding surface by application of low-pressure by the vacuum setup.

\* \* \* \* \*